UNITED STATES PATENT OFFICE.

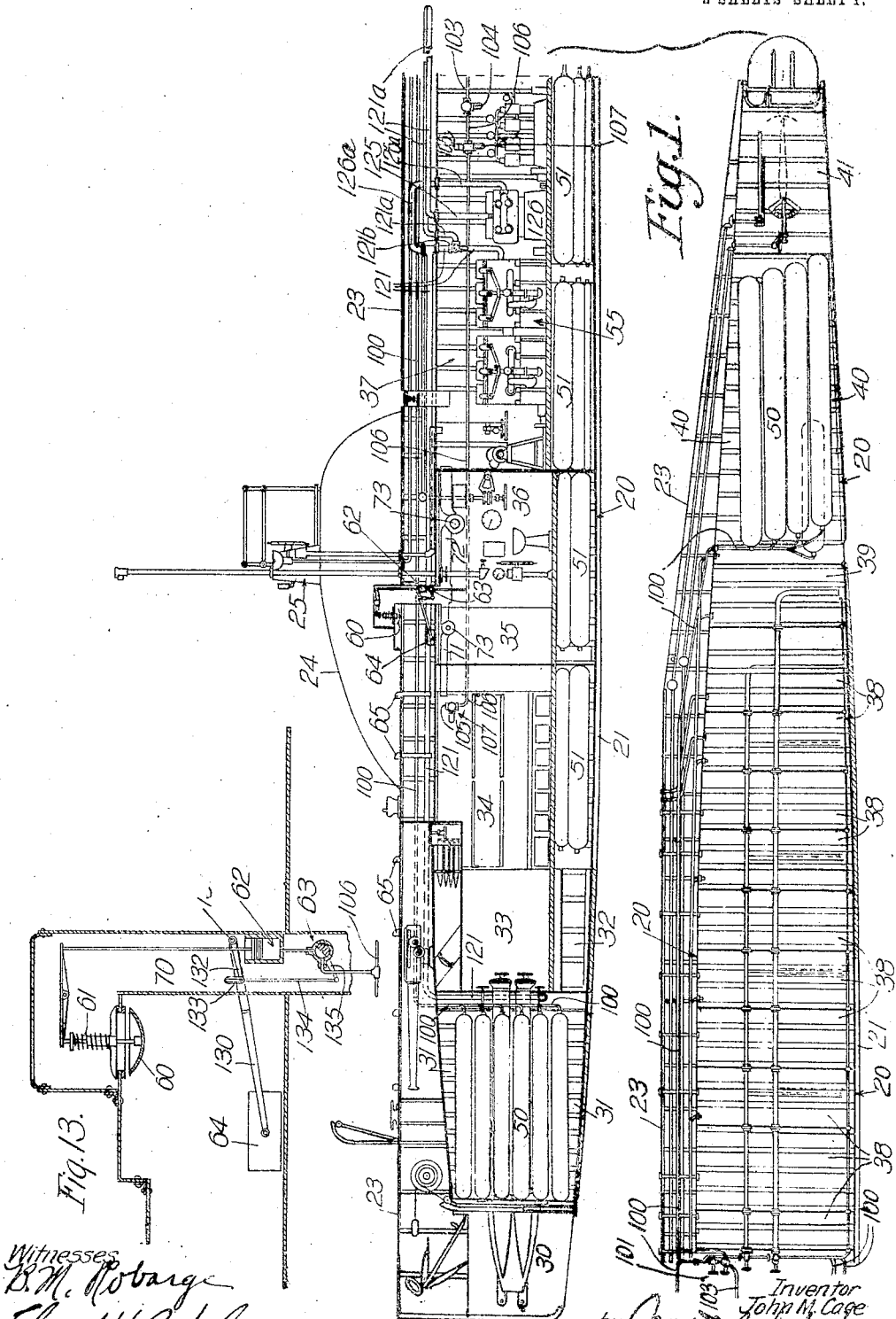

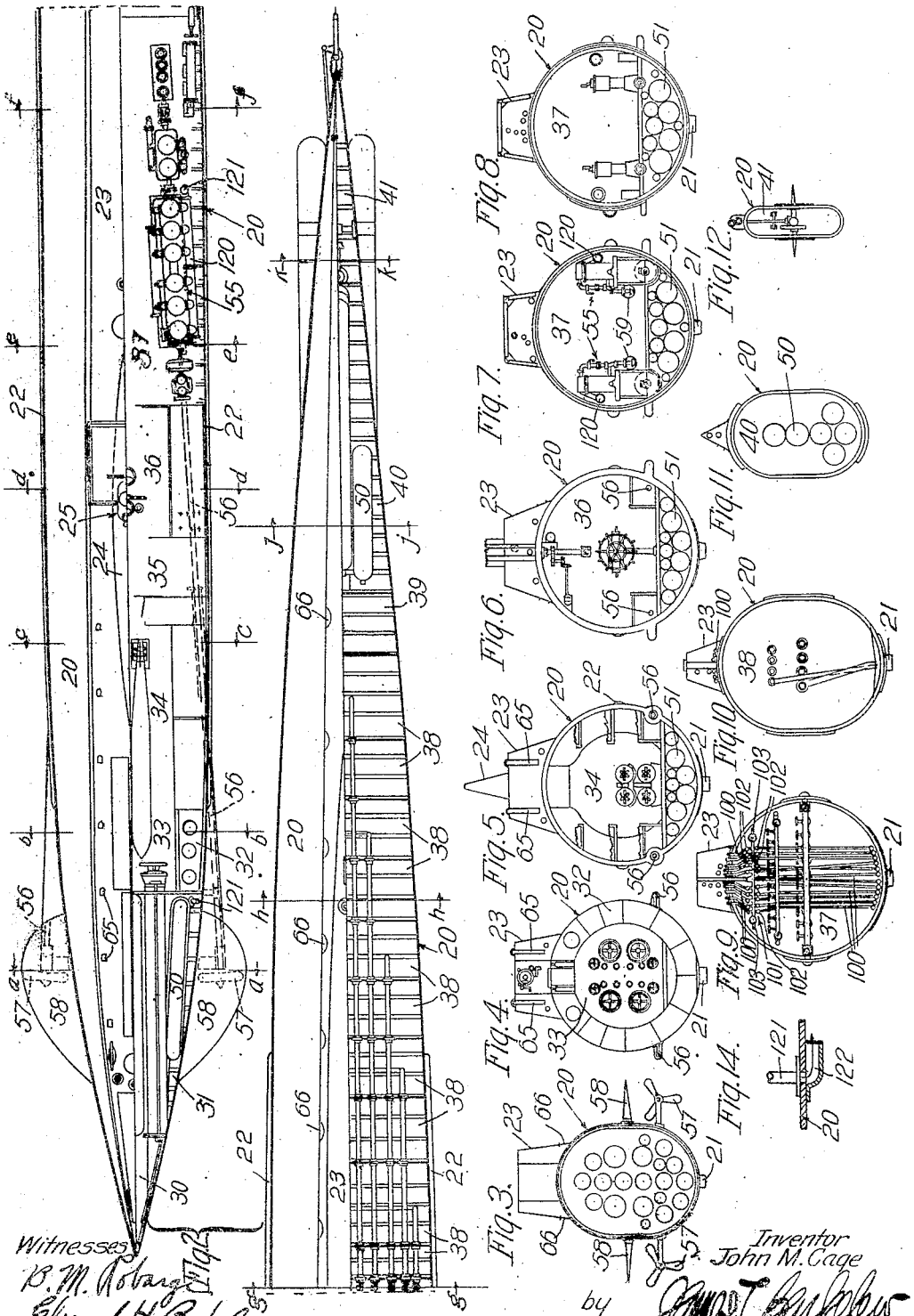

JOHN M. CAGE, OF LONG BEACH, CALIFORNIA, ASSIGNOR TO L. A. SUBMARINE BOAT COMPANY, OF LONG BEACH, CALIFORNIA, A CORPORATION OF CALIFORNIA.

SUBMARINE.

1,126,616.  Specification of Letters Patent. Patented Jan. 26, 1915.

Application filed December 26, 1912. Serial No. 738,745.

*To all whom it may concern:*

Be it known that I, JOHN M. CAGE, a citizen of the United States, residing at Long Beach, in the county of Los Angeles, State of California, have invented new and useful Improvements in Submarines, of which the following is a specification.

This invention relates to improvements in submarines, and particularly to improvements in the propelling machinery and power plants thereof; and the present application has to do with improvements on the submarine shown in my application S N. 634,784, filed June 22nd, 1911.

I have improved the submarine about to be described in this specification in many particulars over the submarine shown and described in the application mentioned; and in the following description I will give a general explanation of the improved form of submarine to enable a clear understanding of the propelling machinery thereof; and in particular, I will specifically describe the propelling and power plant machinery.

The fundamental characteristics of my power plant for submarines is this: that internal combustion engines (or other prime mover using air combustion) are used for propulsion of the vessel either afloat or submerged. I arrange for mechanical expulsion of the exhaust gases overboard, and arrange for automatic supply of air to the engines whether afloat or submerged. This arrangement has many great and distinctive advantages, the two most notable advantages being (1) the availability of practically full power when submerged and (2) the entire elimination of the usual electric propelling machinery. General simplification also results from my improvement; as well as the obtainance of more free space within the vessel interior. I also am enabled to allot a greater proportional space to the ballast and submerging and trimming tanks; and generally, I am enabled in a comparatively small vessel to accomplish results unobtainable in even larger vessels.

It has been demonstrated that a given power will drive a submarine at greater speed completely submerged than when afloat; and in my construction, I am enabled to utilize so nearly the full amount of power when submerged that my submarine will drive faster submerged than afloat. The radius of action afloat is fundamentally limited by the fuel tank capacity; the radius of action submerged is limited by the total air storage facilities. These features, and other details, will be explained in the following detailed specification, reference being had to the accompanying drawings, in which:

Figure 1 is a longitudinal vertical section of my improved submarine. Fig. 2 is a sectional plan of the same. Figs. 3 to 12 inclusive are cross sections taken as indicated by lines *a—a* to *k—k* on Fig. 2. Fig. 13 is an enlarged detail from Fig. 1, showing the atmospheric air intake apparatus. Fig. 14 is a detail section showing the exhaust emergence to sea.

Referring to the drawings, 20 designates the complete hull structure of the vessel, of the general lines and configuration indicated in the two longitudinal views and various sections. The hull is constructed in any approved manner, with suitable frames and braces, and is provided with suitable docking and bilge keels 21 and 22 and with an open super-structure 23 which carries the protective hood 24 and the control turret 25; or the usual conning tower may be substituted for the hood and turret.

The hull interior is divided into the following compartments by suitable bulkheads, the compartments being named in order from forward aft, the bow compartment 30; the forward main ballast tank compartment 31; the forward submerging or trimming ballast tank 32, of annular form; the torpedo operating compartment 33 which is included within the annular ballast tank 32; the crew's compartment 34; the galley 35; the main central operating room 36; the engine compartment 37; ten oil and fuel and ballast tanks 38; the after submerging or trimming tank 39; the after main ballast tank 40; and the stern compartment 41.

Both the forward and aft ballast tanks 31 and 40 contain air bottles 50; and other air bottles 51 are placed beneath the floors 52 of the various operating compartments. The aggregate capacity of the air bottles is sufficient for operation of the propelling engines 55 for a number of hours. The propelling engines 55 are set in the positives illustrated in the engine room 37, the propeller shafts 56 being directly connected with the engine and carrying the propellers 57 at their forward ends near the bow of the boat. Protecting fins 58 are provided for protecting the propellers from injury.

The engine intake is through the carbureters 59 in the ordinary manner, the air for combustion being taken directly out of the engine room. The engine room is supplied with air in two distinct manners; one for surface running and the other for submerged running. Broadly, the air supply includes an automatic atmospheric air supply operated by virtue of the movement of the submarine above or below the surface of the water; and an automatic means controlled by the air pressure in the engine room for delivering air thereto from the compressed air storage.

The air surface feed is controlled directly by a valve 60 normally held closed by a spring 61 and, when the vessel is submerged, held closed by the water pressure. This valve is operated from a cylinder and piston arrangement 62 to which air is admitted and exhausted by a suitable three way valve 63. The valve itself is operated by a float 64 which floats in the interior of the super-structure, the super-structure being open to sea. Air is admitted to the super-structure through suitable ventilators 65, these ventilators extending down through the top of the super-structure to points near the upper plating of the hull, so that the space in the super-structure above the bottoms of these ventilators becomes an air trap to hold a considerable amount of air after the submarine begins submergence. The super-structure is open to sea along its lower edges, as shown at 66; and when the submarine passes beneath the surface, the water entering the super-structure must rise from the bottom. There is sufficient air in the trap within the super-structure to suffice for the engine operation for several minutes; and this feature provides that the atmosphere air feed shall not be discontinued every time the submarine momentarily passes beneath the surface. This is of particular importance when cruising in a heavy sea; as otherwise the atmospheric air feed would be cut off every time the vessel passed beneath a sea and the stored air would be drawn on from time to time. Float 64 is arranged to move upwardly on the surface of the water rising within the super-structure; and it acts to cause the closure of valve 60 only when the water has risen and has practically driven all of the air through the valve opening 60 and through the ventilating shaft 70 and into the interior of the vessel. From the ventilating shaft there lead two ventilating ducts 71 and 72 to the crew's space and the engine room, respectively; each of these ducts being supplied with a ventilating fan 73 which materially helps the movement of the air.

The air bottles 50 are all connected by pipes 100 individually to an air pressure manifold 101 situated in the engine room. Valves 102 are provided so that the air may be taken from the individual bottles, one or more at a time, and thus conserve the high pressure in as many bottles as possible. From this manifold the air pressure line 103 leads to points throughout the vessel where the air pressure may be needed. This is the high pressure system; and it may connect with a low pressure system through the medium of a reducing valve 104, the low pressure piping passing throughout the vessel wherever needed. From the low pressure piping 106 there is an outlet 105 which is controlled by the reducing valve 107, this reducing valve being set to open when the atmospheric pressure in the engine room falls to a certain point below normal. As soon as the atmospheric air feeding devices have cut off, the air pressure within the engine room and other compartments begins to drop; and this drop in pressure will immediately cause the beginning of feed from the stored compressed air. Thus the system is entirely automatic and needs no attention from the operator. But, should any of the apparatus become disabled, air may be admitted by hand into the working compartment.

The exhaust from the engine passes out through the exhaust manifold 120 and exhaust pipe 121, this exhaust pipe running through upper plating of the hull into the super-structure and thence forwardly and down through the hull in the ballast tank 31, and emerging to the water behind and beneath the propellers 57. The emergence of the exhaust is shown in detail in Fig. 14, the pipe 121 discharging beneath a cover or "clam-shell" 122 which forces the exhaust rearwardly. This arrangement provides that the suction of the water through which the vessel is passing will materially help in drawing out the exhaust. The exhaust from the engine may pass directly to sea at this outlet when the vessel is running on the surface; but when the vessel is submerged and the pressure is great, the exhaust is passed through pipe 121$^a$ into the super-structure, where the contact with the water cools it, and is then passed down through induction pipe 125 into the mechanical exhaust compressor 126. This compressor is operated with the engine 55 and compresses the exhaust out through pipe 126$^a$ into the pipe 121 which passes to the exhaust outlet forward.

The amount of power utilized by the mechanical exhaust apparatus is practically negligible for all ordinary depths of submergence; and in practice I have found that I am enabled to force the exhaust out of the vessel against a head much greater than two hundred feet submergence.

Having described my invention, I claim:

1. In a submarine in combination, a hull having an engine compartment therein, means for inducing atmospheric air to said compartment when the submarine is afloat, air storage means within the submarine, means for delivering air from said storage to the engine compartment under control of the air pressure in the compartment, a combustion engine utilizing air from the engine compartment, and mechanism forcing the engine exhaust overboard.

2. In a submarine in combination, a hull having an engine compartment therein, means for inducing atmospheric air to said compartment when the submarine is afloat, air storage means within the submarine, means under control of the air pressure in the engine compartment for delivering air from said storage to the engine compartment, a combustion engine utilizing air from the engine compartment, and mechanism operated by the engine for compressing the engine exhaust and forcing it overboard.

3. In a submarine in combination, a hull having an engine compartment therein, means for inducing atmospheric air to said compartment when the submarine is afloat, air storage means within the submarine, means for delivering air from said storage to the engine compartment, said means including an automatic valve which allows such delivery when the air pressure in the engine compartment falls below a predetermined point, a combustion engine utilizing air from the engine compartment, and mechanism for compressing the engine exhaust and forcing it overboard.

4. In a submarine in combination, a hull having an engine compartment therein, means for inducing atmospheric air to said compartment when the submarine is afloat, said means including valve mechanism operated by change of level of the submarine with reference to the water surface, air storage means within the submarine, means for delivering air from said storage to the engine compartment, said means including an automatic valve which allows such delivery when the air pressure in the engine compartment falls below a predetermined point, a combustion engine utilizing air from the engine compartment, and mechanism operated by the engine for compressing the engine exhaust and forcing it overboard.

5. In a submarine in combination, a hull having an engine compartment, a combustion engine therein arranged for propelling the submarine and exhausting overboard from the submarine and having its air intake from the engine compartment, atmospheric air induction means for said compartment, said means including a water float and a valve controlled thereby, air storage means, and means controlled by the air pressure within the engine compartment to deliver air from the storage means to the compartment.

6. In a submarine in combination, a hull having a plurality of compartments including an engine compartment, a combustion engine therein arranged to propel the submarine having its air intake from the engine compartment, atmospheric air induction means for the compartments including said engine compartment, said means including a water float and a valve controlled thereby, air storage means, means controlled by the air pressure within the compartment to deliver air thereto from the storage means, and mechanism for compressing the engine exhaust and forcing it overboard.

7. In a submarine in combination, a hull having a plurality of compartments including an engine compartment, a combustion engine therein arranged to propel the submarine having its air intake from the engine compartment, atmospheric air induction means for the compartments including said engine compartment, said means including a water float and a valve controlled thereby, air storage means, means controlled by the air pressure within the compartment to deliver air thereto from the storage means, and mechanism operated by the engine for compressing the engine exhaust and forcing it overboard.

8. In a submarine, in combination, a hull having an engine compartment, a combustion engine in said compartment having its exhaust leading overboard from the submarine and having its intake from the interior of the engine compartment, means for inducing atmospheric air to the engine compartment while the submarine is on the surface and for closing said induction means when the submarine submerges, air storage on the submarine, and means controlled by the air pressure in the engine compartment to feed air from the storage to said compartment.

9. In a submarine, in combination, a hull having an engine compartment, a combustion engine in said compartment having its intake from the atmosphere of said compartment and having its exhaust leading overboard from the submarine, air storage on the submarine, and means automatically controlled by the air pressure in the compartment for admitting air from the storage to the compartment.

10. In a submarine, in combination, a hull having an engine compartment, a combustion engine in said compartment having its intake from the atmosphere of said compartment and having its exhaust leading overboard from the submarine, means for inducing atmospheric air to the engine compartment, means automatically controlled by submergence or flotation of the hull to close and open said air induction means, air storage on the submarine, and means automatically controlled by the air pressure in the engine compartment for admitting air from the storage to the compartment.

11. In a submarine, in combination, a hull having an engine compartment, a combustion engine in said compartment having its intake from the atmosphere of said compartment, means for forcing the exhaust of the engine overboard from the submarine, air storage on the submarine, and means automatically controlled by the air pressure in the engine compartment for admitting air from the storage to the compartment.

12. In a submarine, in combination, a hull having an engine compartment, a combustion engine in said compartment, having its intake from the atmosphere of said compartment, means for forcing the exhaust of the engine overboard from the submarine, means for inducing atmospheric air to the engine compartment, means automatically controlled by submergence or flotation of the hull to close and open said air induction means, air storage on the submarine, and means automatically controlled by the air pressure in the engine compartment for admitting air from the storage to the compartment.

In witness that I claim the foregoing I have hereunto subscribed my name this 3rd day of December 1912.

JOHN M. CAGE.

Witnesses:
G. HESPENGARNEY,
ELWOOD H. BARKELEW.